(No Model.)

T. A. EDISON.
MANUFACTURE OF ELECTRIC LAMPS.

No. 251,544. Patented Dec. 27, 1881.

WITNESSES:

INVENTOR:
T. A. Edison
BY Dyer & Wilber
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

MANUFACTURE OF ELECTRIC LAMPS.

SPECIFICATION forming part of Letters Patent No. 251,544, dated December 27, 1881.

Application filed June 22, 1881. (No model.)

*To all whom it may concern:*

Be it known that I, THOMAS A. EDISON, of Menlo Park, in the county of Middlesex and State of New Jersey, have invented a new and useful Improvement in the Manufacture of Electric Lamps; and I do hereby declare that the following is a full and exact description of the same, reference being had to the accompanying drawings, and to the letters of reference marked thereon.

The object I have in view is to produce a simple and economical method of uniting the carbon filament of an incandescing electric lamp with the leading-in wires of the same. This I accomplish by first attaching short copper wires to the ends of the carbon filament mechanically, then uniting the wires and carbon filament permanently by electroplating the joints, and then fusing or soldering these short wires to the leading-in wires which have been previously sealed in the glass wire-support of the lamp. The short copper wires may be connected directly with the platinum wires that are sealed in the glass, or with intermediate sections of copper wire.

For carrying out this method I use an electroplating-cell, into which the ends of the carbon and the short copper wires mechanically attached thereto are hung, the carbon loop being supported by a metal arm to which the negative pole of the battery is connected. This arm may be adjustable vertically, so that the carbon can be set the right depth in the solution. The wires below the joint may be covered with varnish, wax, or other substance, preventing deposition thereon. The leading-in wires sealed in the glass wire-support and these short copper wires are brought together in the flame of a blow-pipe and fused, the glass wire-support and the carbon filament being held by suitable supports. The glass wire-support is then connected with the globe or bulb and the same exhausted and sealed as described in my patents and former applications.

Figure 1:
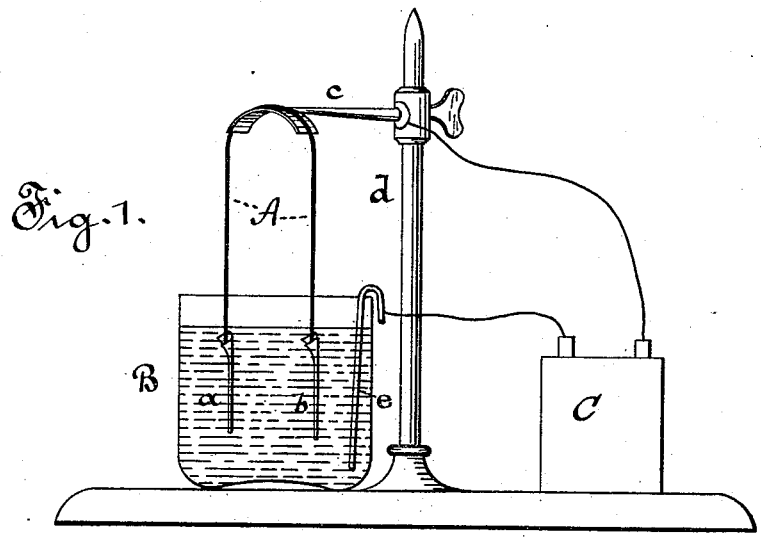
Figure 2:
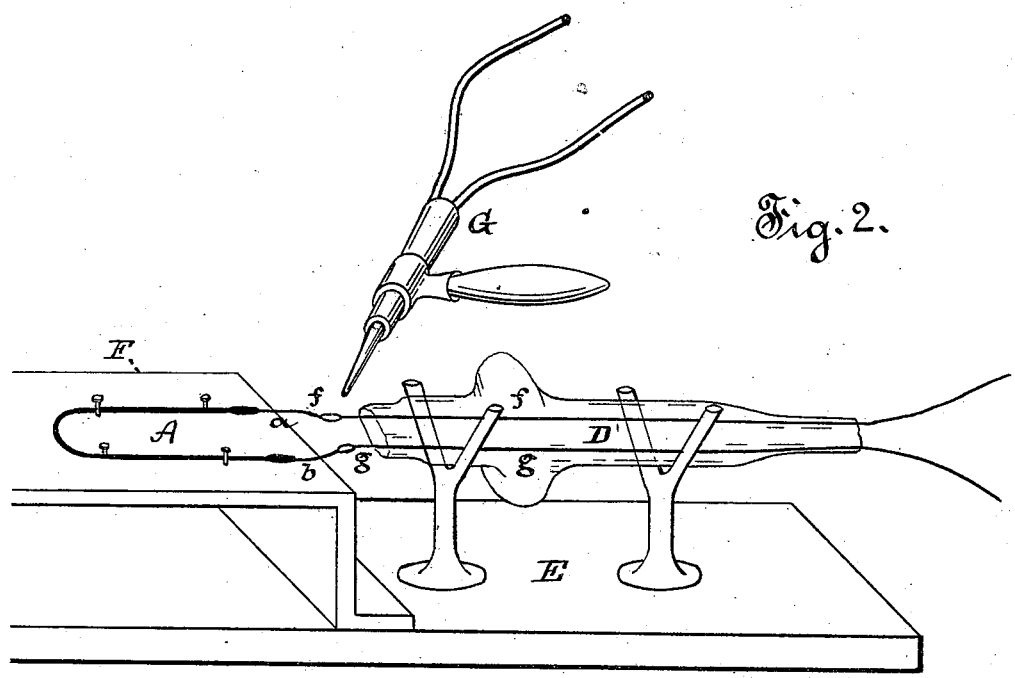

In the drawings, Figure 1 shows the arrangement for electroplating the mechanically-formed joints of the carbon filament and short copper wires, and Fig. 2 the arrangement for fusing the wire ends together.

A is the carbon filament, which has the short copper wires *a b* secured to its ends mechanically. This may be accomplished in several ways; but I prefer to flatten the ends of the wires and wrap them around the carbon ends.

B is the electroplating cell, above which is the arm *c*, vertically adjustable on standard *d*. The carbon is hung over this arm into the solution of the cell, the negative pole of the battery C being connected with this arm, while the positive pole leads to the electrode *e*, forming the anode of the cell.

D is the glass wire-support of the lamp, and *f g* are the leading-in wires. The platinum sections of these leading-in wires are sealed in the top of the glass support.

E is a stand for holding the wire-support D in a horizontal position, and F is another stand for supporting the carbon filament, so that the short copper wires *a b*, united with said carbon filament by electroplated joints, can be brought together with the leading in wires *f g* in the flame of the blow-pipe G.

What I claim is—

The method of uniting the carbon filament and leading-in wires of an incandescing electric lamp, consisting in first attaching short wires mechanically to the carbon filament, then electroplating such joints, and then fusing or soldering these short wires to the leading-in wires of the lamp, substantially as set forth.

This specification signed and witnessed this 20th day of May, 1881.

THOS. A. EDISON.

Witnesses:
RICHD. N. DYER,
H. W. SEELY.